US012716473B2

(12) United States Patent
Peterson et al.

(10) Patent No.: US 12,716,473 B2
(45) Date of Patent: Aug. 25, 2026

(54) LINEAR SLIDE MECHANISM

(71) Applicant: Magna Exteriors Inc., Aurora (CA)

(72) Inventors: Ted E. Peterson, Howell, MI (US); Yao Wang, Troy, MI (US); Martin R. Matthews, Troy, MI (US)

(73) Assignee: Magna Exteriors Inc., Aurora (CA)

( * ) Notice: Subject to any disclaimer, the term of this patent is extended or adjusted under 35 U.S.C. 154(b) by 0 days.

(21) Appl. No.: 18/953,457

(22) Filed: Nov. 20, 2024

(65) Prior Publication Data

US 2025/0075776 A1 Mar. 6, 2025

Related U.S. Application Data

(63) Continuation of application No. 17/770,359, filed as application No. PCT/US2020/056669 on Oct. 21, 2020, now Pat. No. 12,173,776.

(60) Provisional application No. 62/923,850, filed on Oct. 21, 2019.

(51) Int. Cl.

| | |
|---|---|
| ***F16H 21/10*** | (2006.01) |
| ***B29C 45/33*** | (2006.01) |
| ***B29C 45/36*** | (2006.01) |
| ***F16H 21/04*** | (2006.01) |

(52) U.S. Cl.

CPC ............. *F16H 21/10* (2013.01); *F16H 21/04* (2013.01); *B29C 45/33* (2013.01); *B29C 45/36* (2013.01)

(58) Field of Classification Search

CPC ......... F16H 21/10; F16H 21/04; B29C 45/33; B29C 45/36

USPC ........................................................ 74/89.33

See application file for complete search history.

(56) References Cited

U.S. PATENT DOCUMENTS

| | | | | |
|---|---|---|---|---|
| 5,799,543 A * | 9/1998 | Nagai | B25J 19/0029 74/490.09 | |
| 2005/0109139 A1 * | 5/2005 | Nagai | F16C 29/02 74/89.33 | |

FOREIGN PATENT DOCUMENTS

| | | |
|---|---|---|
| CN | 107303715 B | 11/2020 |
| DE | 102012108450 A1 | 3/2014 |
| FR | 2193695 A1 | 2/1974 |
| GB | 1436107 A | 5/1976 |
| KR | 102239342 B1 | 4/2021 |
| WO | WO2006120373 A2 | 11/2006 |
| WO | WO2021081099 A1 | 4/2021 |

OTHER PUBLICATIONS

Written Opinion & International Search Report for PCT/US2020/056669 dated Mar. 12, 2021, (9 pages).

* cited by examiner

*Primary Examiner* — Terence Boes

(57) ABSTRACT

An injection molded slide actuator assembly which has a frame, a slide carrier and a slide track member. The injection molded slide actuator has an X, Y, and Z axis with the slide track member having at least one track slot extending along the y and the Z direction and said slide carrier having at least one cooperating outwardly extending side members for engaging the at least one track slot.

19 Claims, 14 Drawing Sheets

LINEAR SLIDE MECHANISM

CROSS-REFERENCE TO RELATED APPLICATIONS

This application is a Continuation of U.S. patent application Ser. No. 17/770,359, filed Apr. 20, 2022 and is a National Stage of PCT International Application No. PCT/US2020/056669, filed Oct. 21, 2020 and claims the benefit of U.S. Provisional Patent Application No. 62/923,850, filed Oct. 21, 2019. The disclosures of the above applications are incorporated herein by reference.

FIELD OF THE INVENTION

The present invention relates to a linear slide mechanism.

BACKGROUND OF THE INVENTION

It is a goal in the art to create a linear slide mechanism out of plastic by minimizing part count complexity. Today most slide mechanisms consist of metal, stamped parts, and also with bushings. The cost is relatively high. The system is generally sensitive to contamination, environment, and misalignment.

There have been several problems with linear slide mechanisms available today. Most linear slide mechanisms have a high part content. Usually high precision is required for this kind of mechanism and therefore they are costly. These parts can also have problems if any of the tolerances in the parts are slightly off. Parts are typically metal in such mechanisms. Other materials have been used and plastic linear slide mechanisms have been attempted. Any plastic slide mechanism guide is usually extruded, which requires more components.

Therefore, it is a goal in the art, to provide a linear motion system that can be injection molded with minimal numbers of parts and which overcomes issues with draft for long linear motion.

SUMMARY OF THE INVENTION

An injection molded slide actuator assembly which has a frame, a slide carrier and a slide track member. The injection molded slide actuator, has an X, Y, and Z axis with the slide track member having at least one track slot extending along the Y and the Z direction and said slide carrier having at least one cooperating outwardly extending side members for engaging the at least one track slot.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
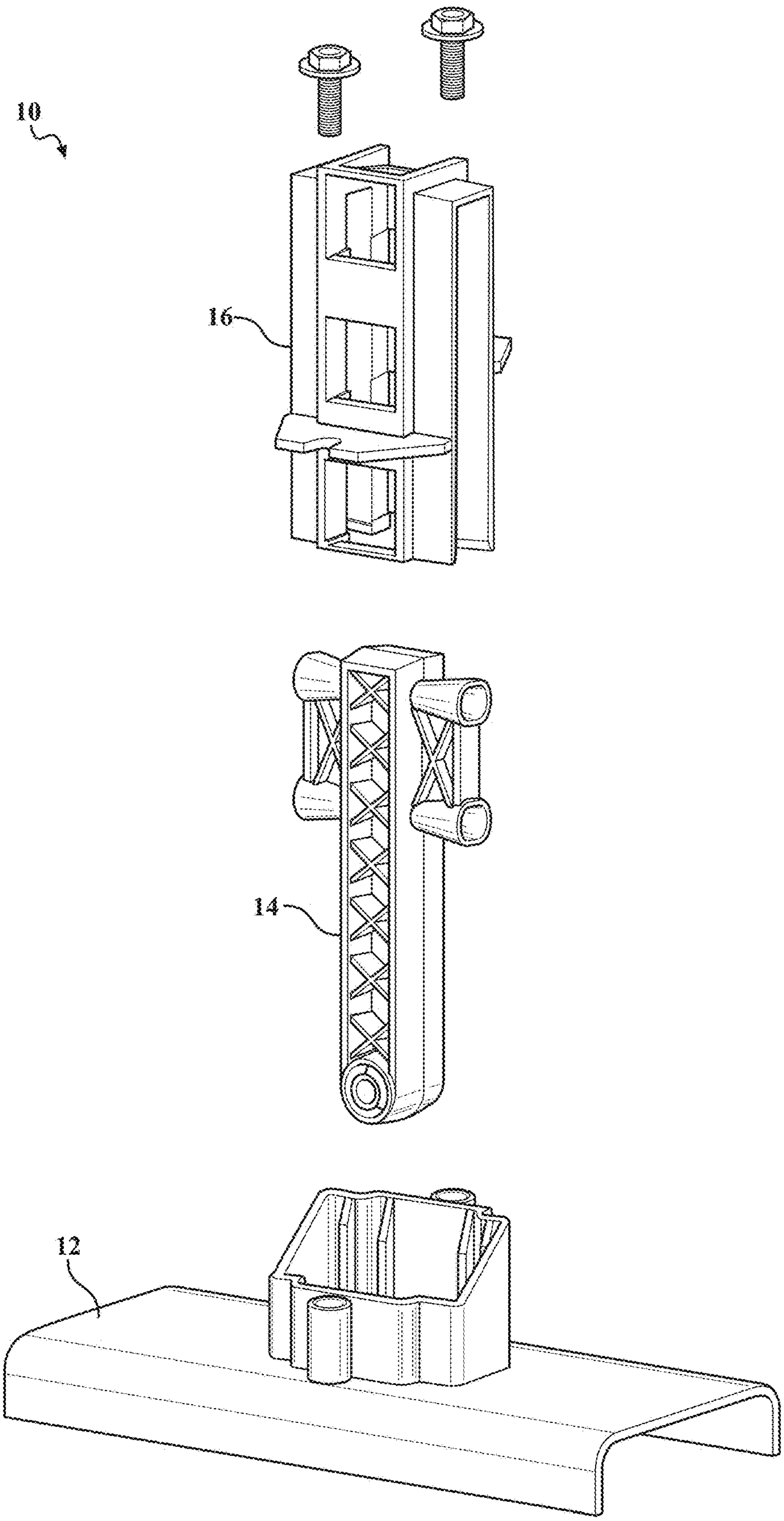
FIG. 1 is an exploded perspective view of the injection molded slide actuator assembly of the present invention.
Figure 2:
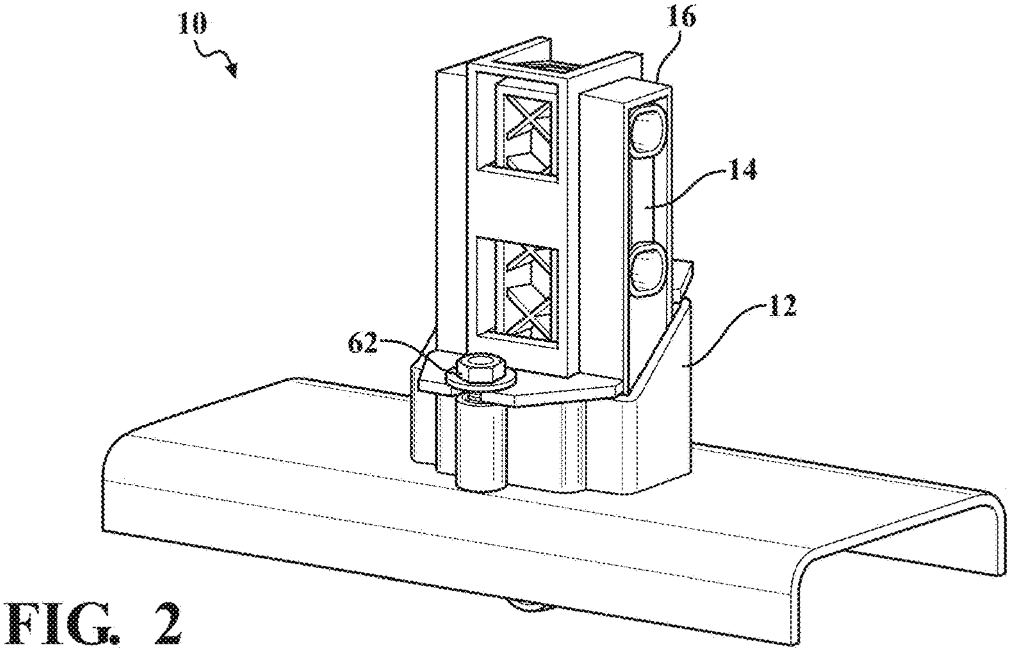
FIG. 2 is a perspective view of the injection molded slide actuator assembly of the present invention in the retracted position.
Figure 3:
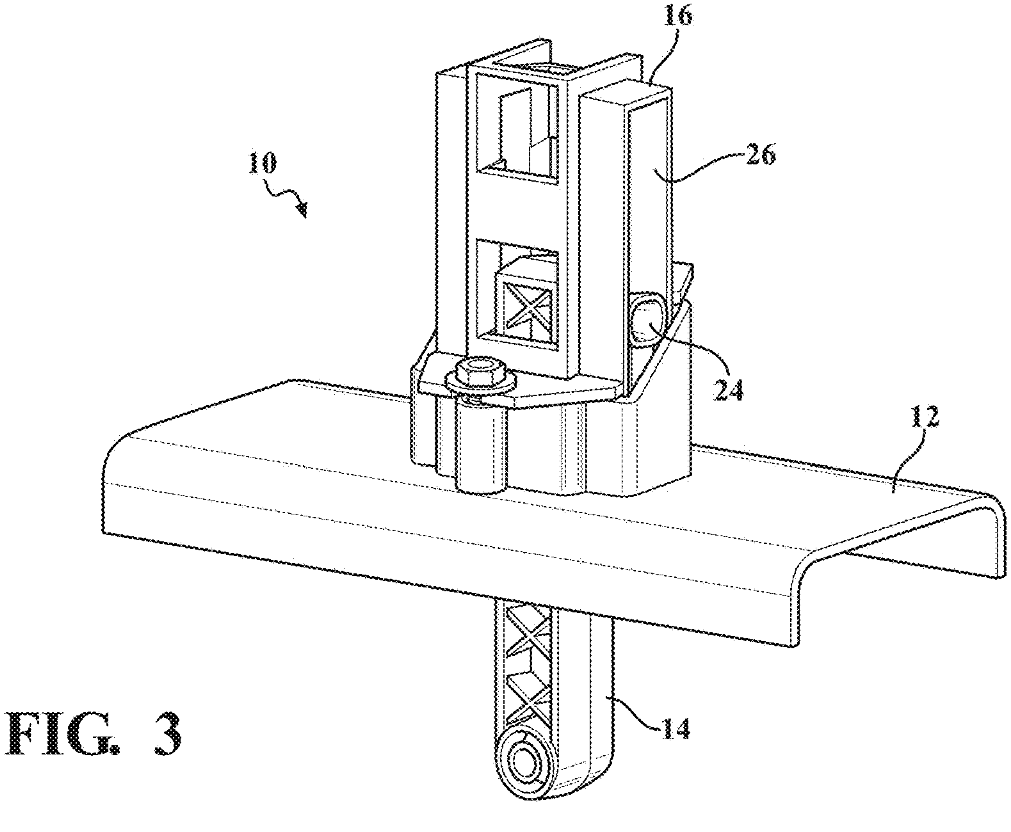
FIG. 3 is a perspective view of the injection molded slide actuator assembly of the present invention in the deployed position.
Figure 4:
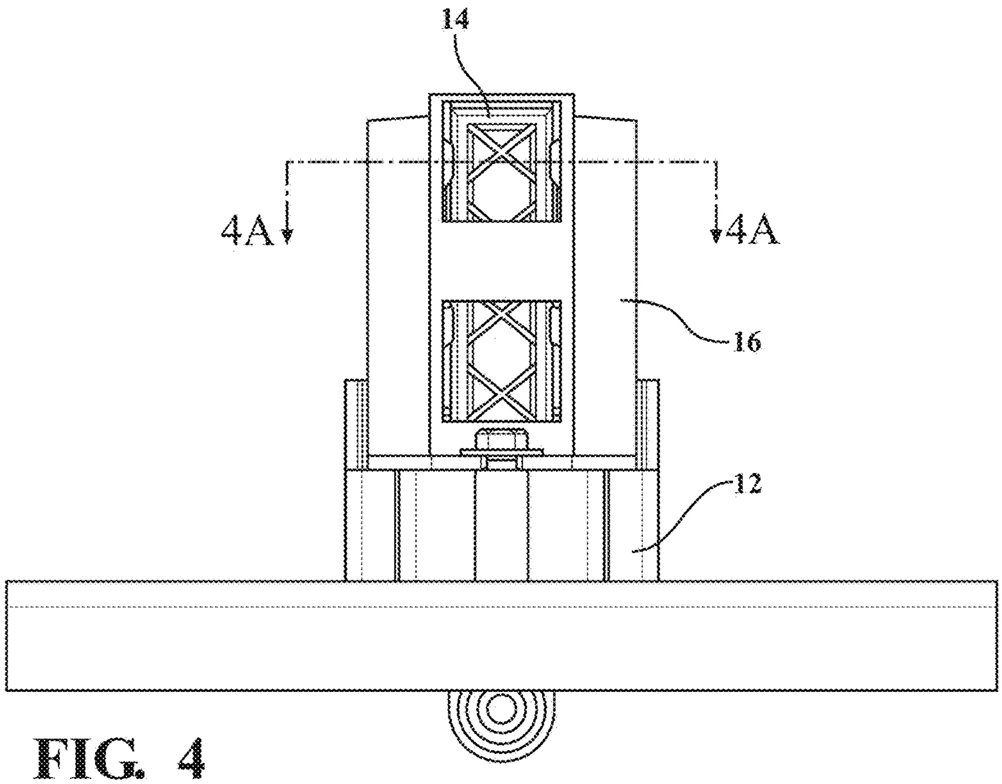
FIG. 4 is a front side view of the injection molded slide actuator assembly of the present invention.
Figure 4A:
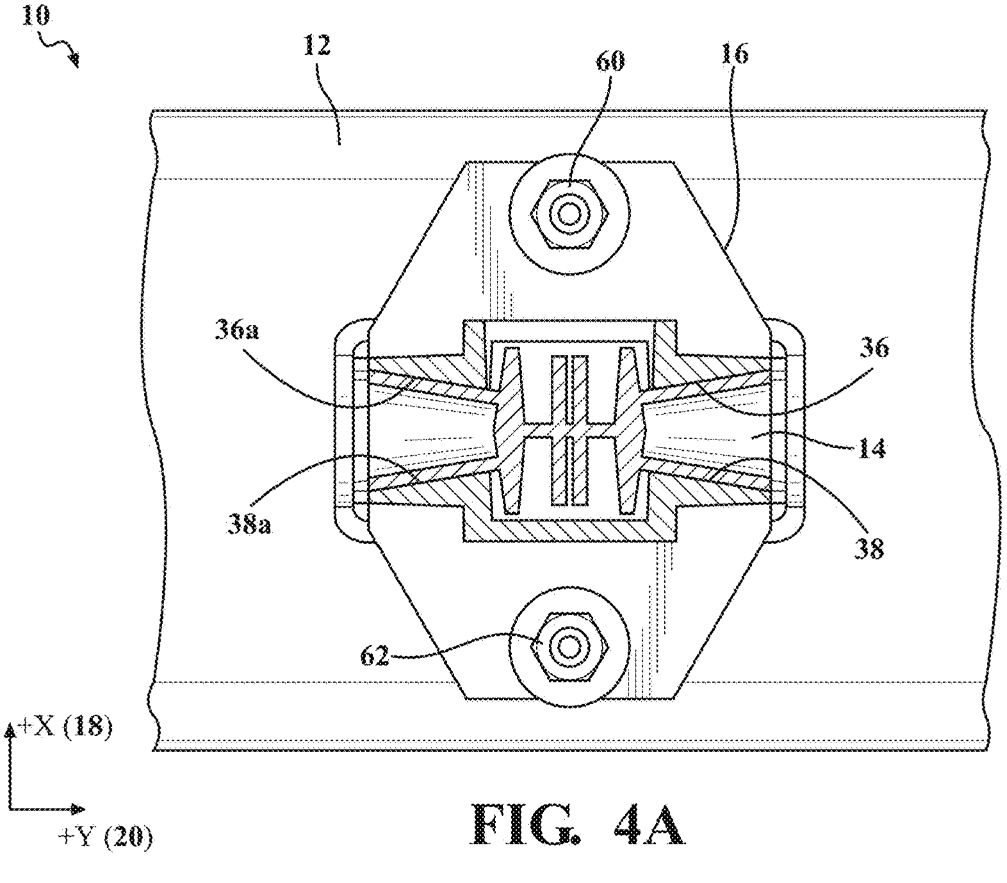
FIG. 4A is a sectional view taken along line 4A-4A of FIG. 4 showing the drafted contact areas of the injection molded slide actuator assembly of the present invention.
Figure 5A:
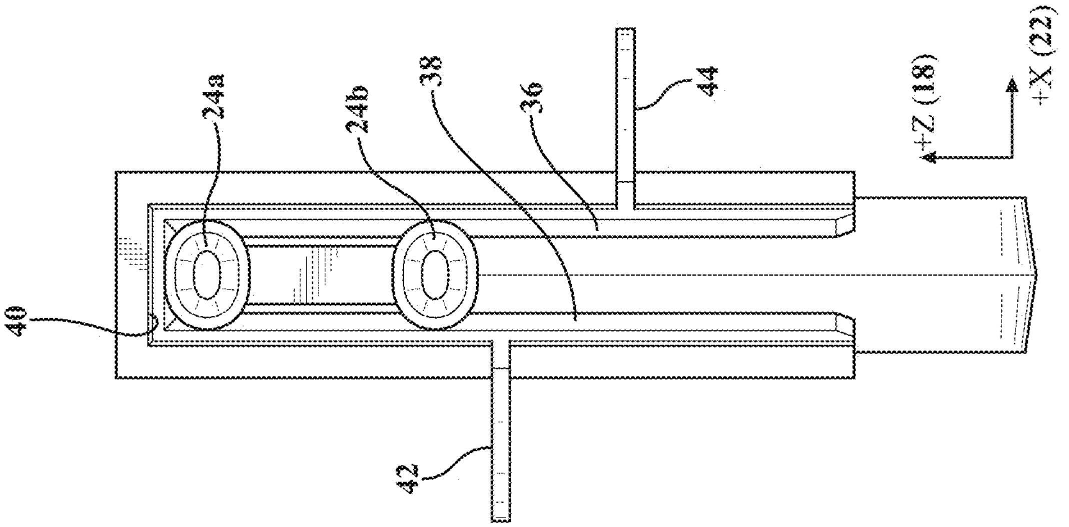
FIG. 5A is a side view showing the positioning of the slide carrier and draft of the slide track member.
Figure 5:
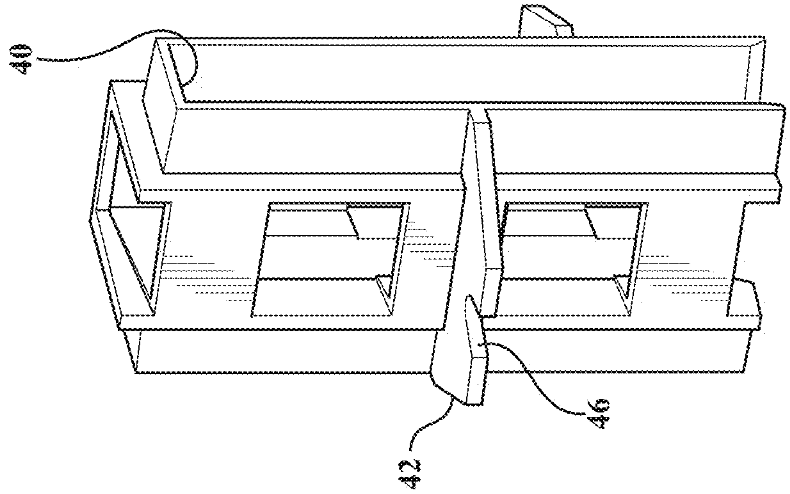
FIG. 5 is a perspective view of the slide track member portion of the slide actuator assembly of the present invention.
Figure 6:
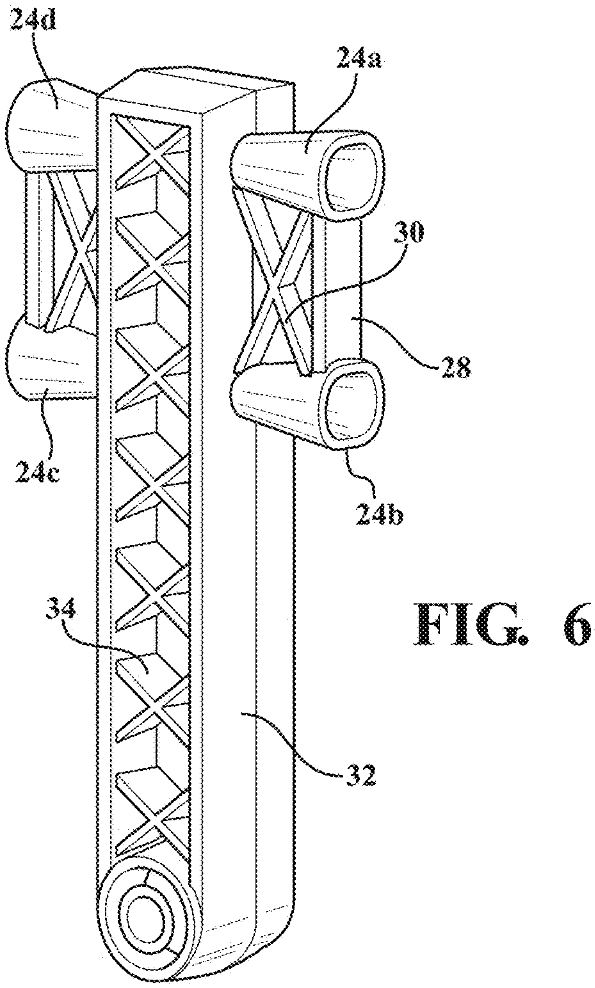
FIG. 6 is a perspective view showing the tooling of the slide carrier portion of the slide actuator assembly of the present invention.
Figure 6A:
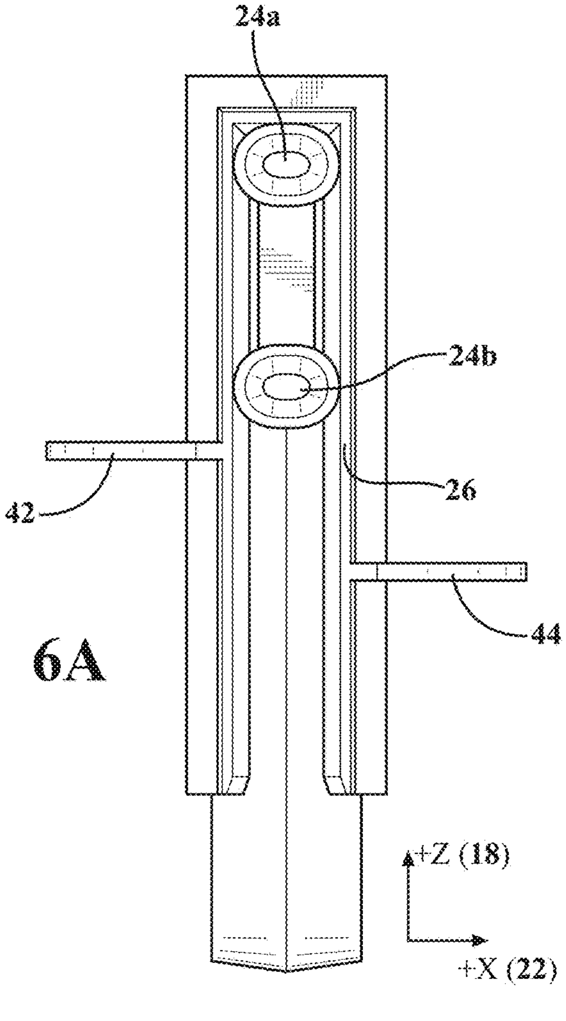
FIG. 6A is a side view showing the tooling of the slide carrier portion of the slide actuator assembly of the present invention.
Figure 7:
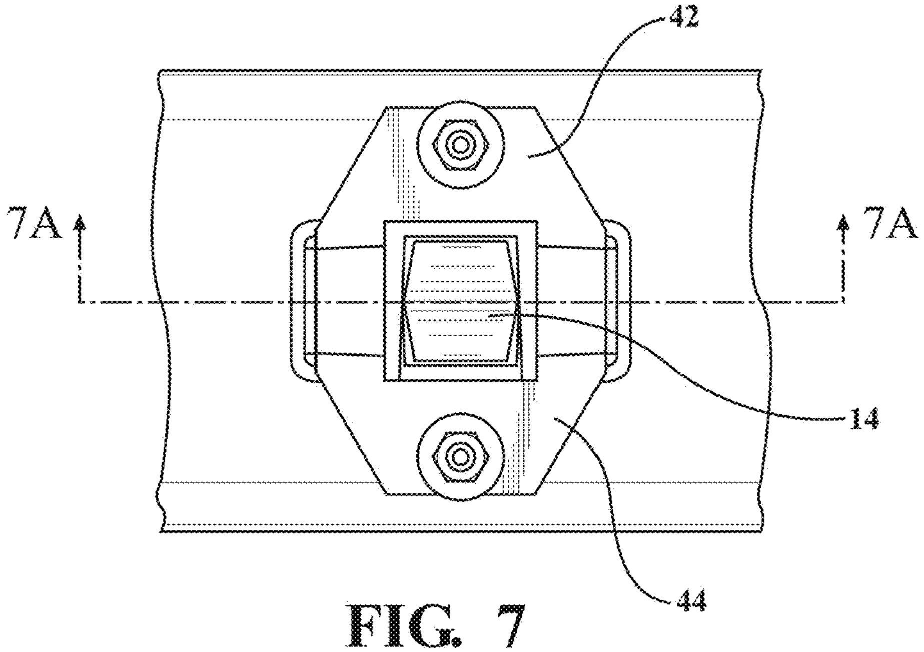
FIG. 7 is a top view of the present invention.
Figure 7A:
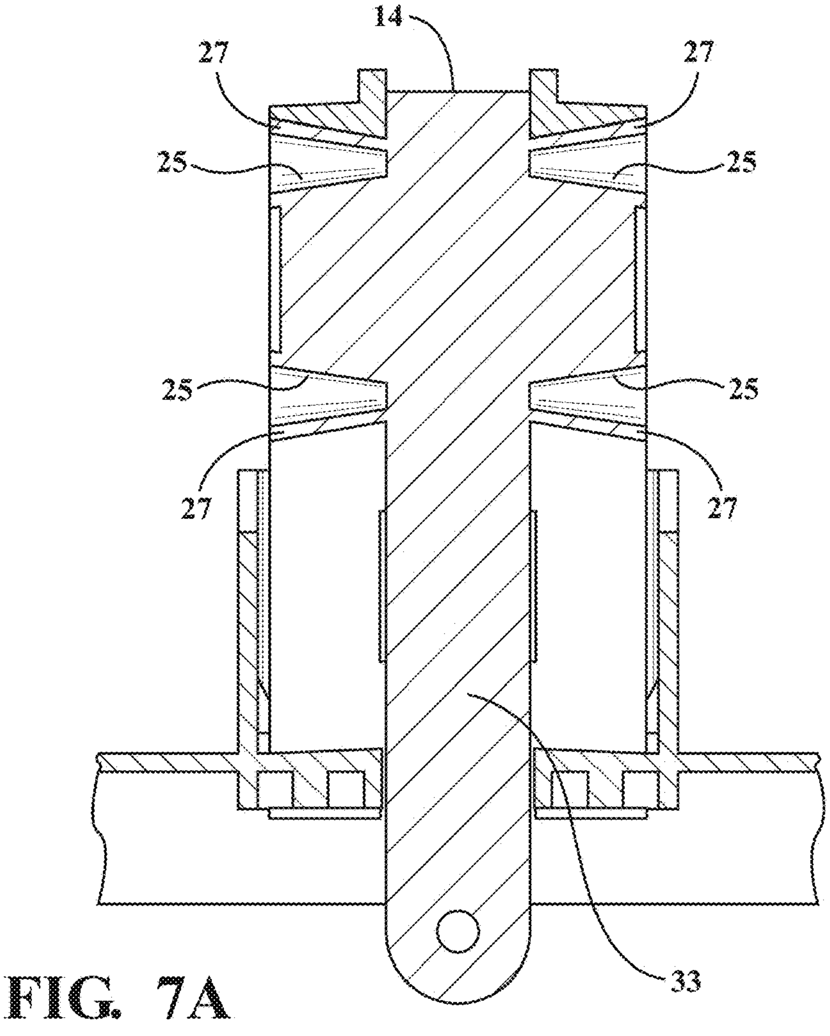
FIG. 7A is a sectional view taken along line 7A-7A of FIG. 7 showing the stop arrangements for slide actuator assembly of the present invention.
Figure 7B:
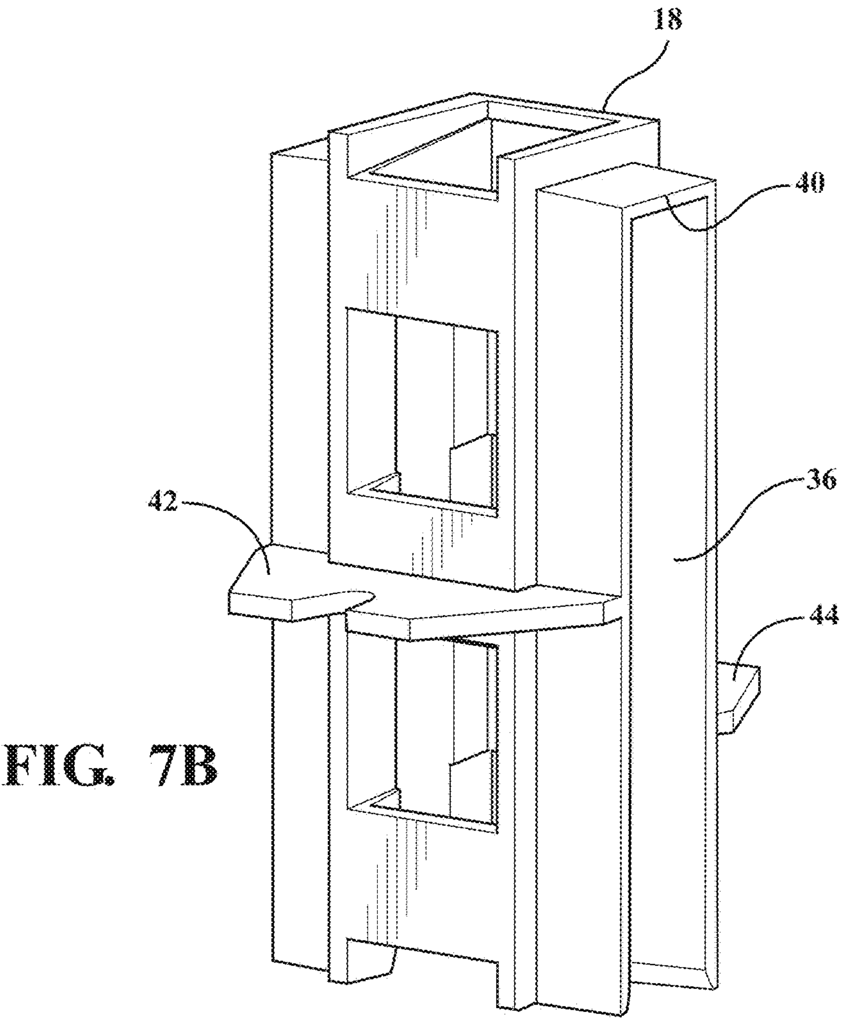
FIG. 7B is a perspective view of the slide track member showing the stop arrangements for slide actuator assembly of the present invention.
Figure 8:
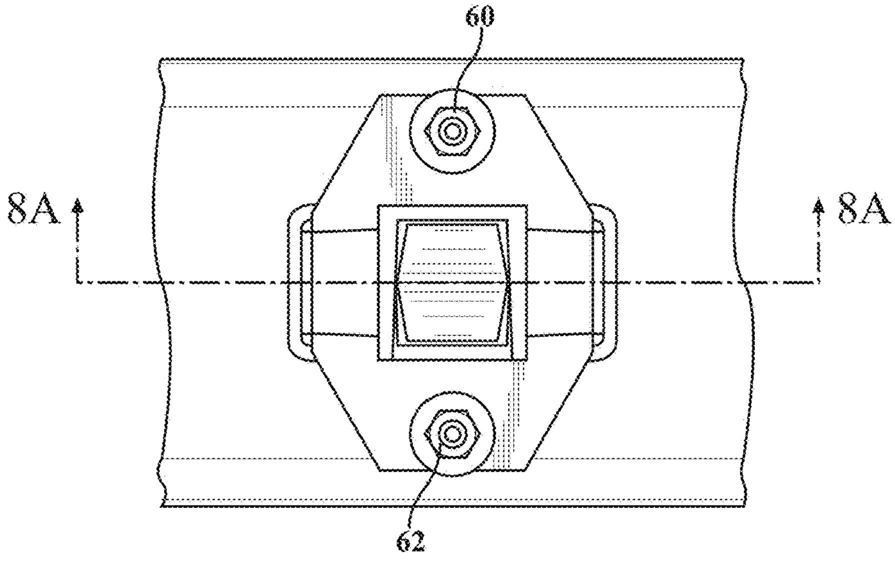
FIG. 8 is a top view of the stop mechanisms during deployment of the slide actuator assembly of the present invention.
Figure 8A:
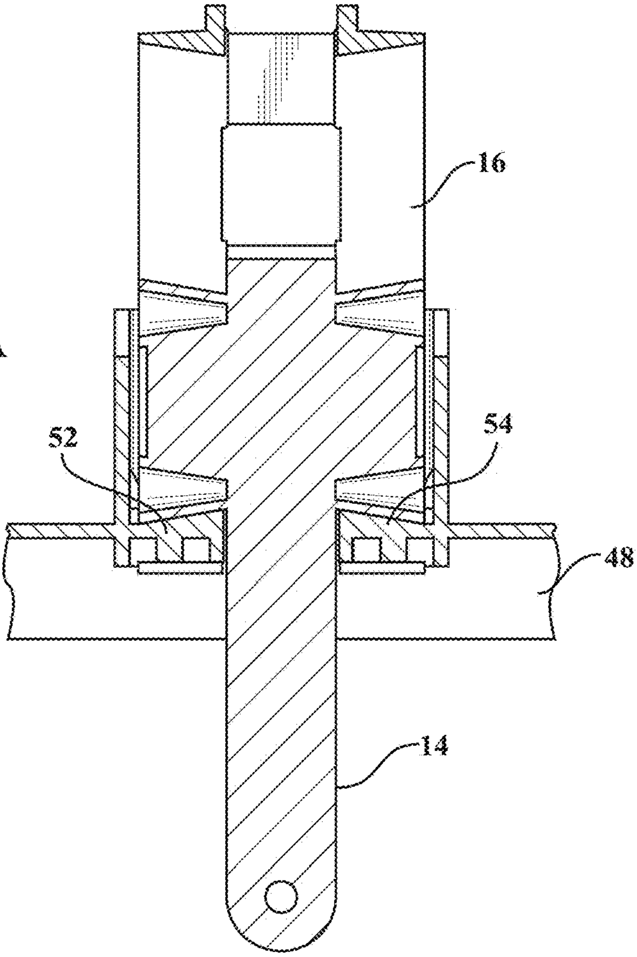
FIG. 8A is a sectional view taken along line 8A-8A of FIG. 8 showing the stop mechanisms during deployment of the slide actuator assembly of the present invention.
Figure 8B:
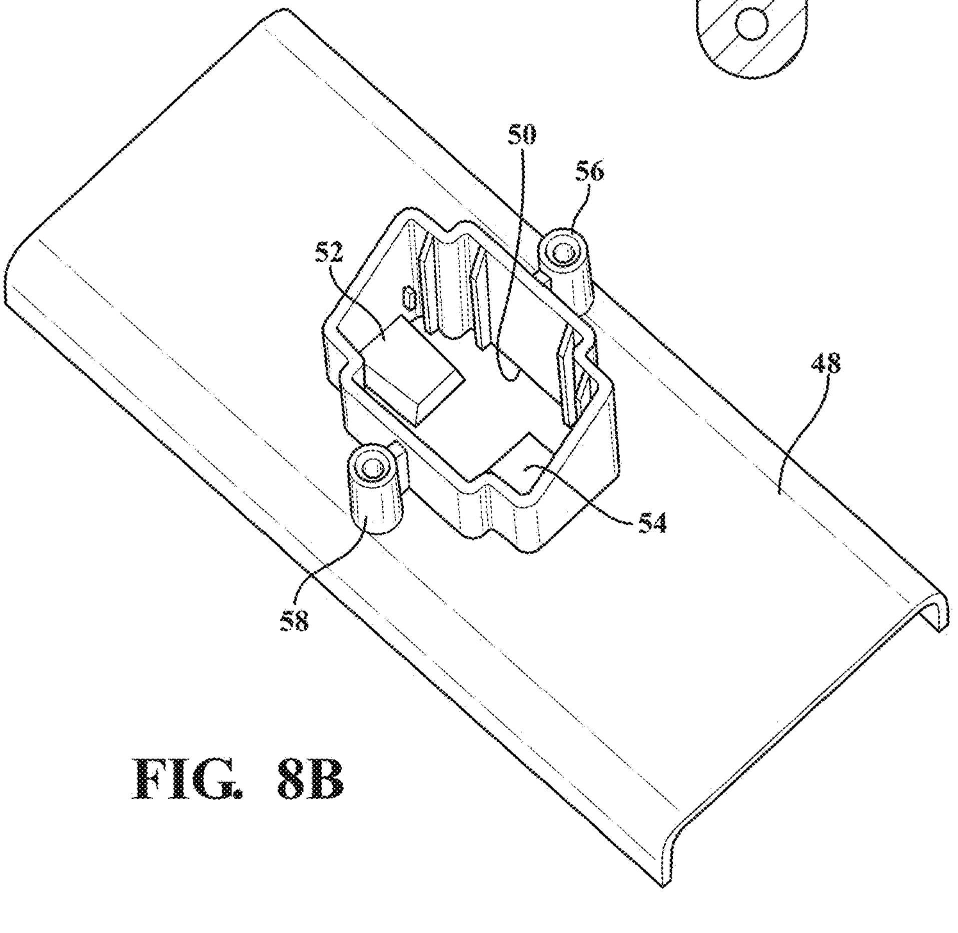
FIG. 8B is a perspective view of the frame receiver portion showing the stop mechanisms during deployment of the slide actuator assembly of the present invention.
Figure 9B:
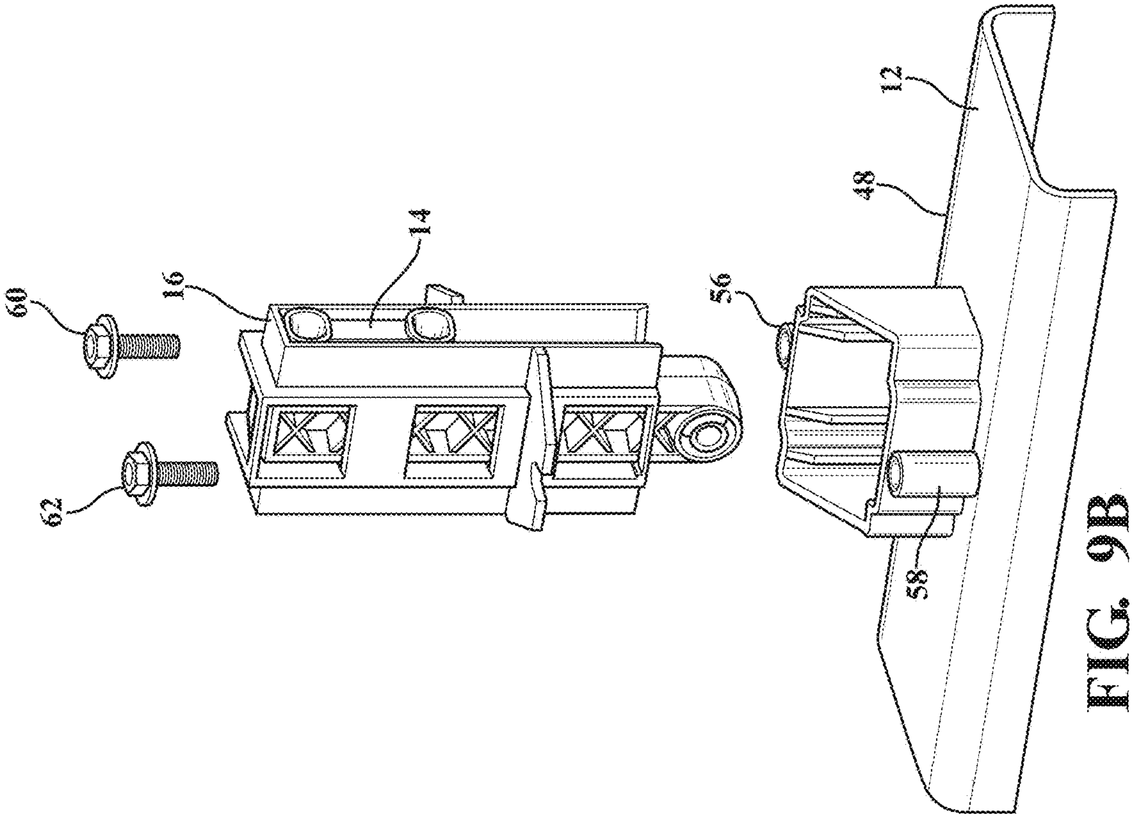
FIGS. 9A through 9D show the method of assembly of the slide actuator assembly of the present invention.
Figure 9A:
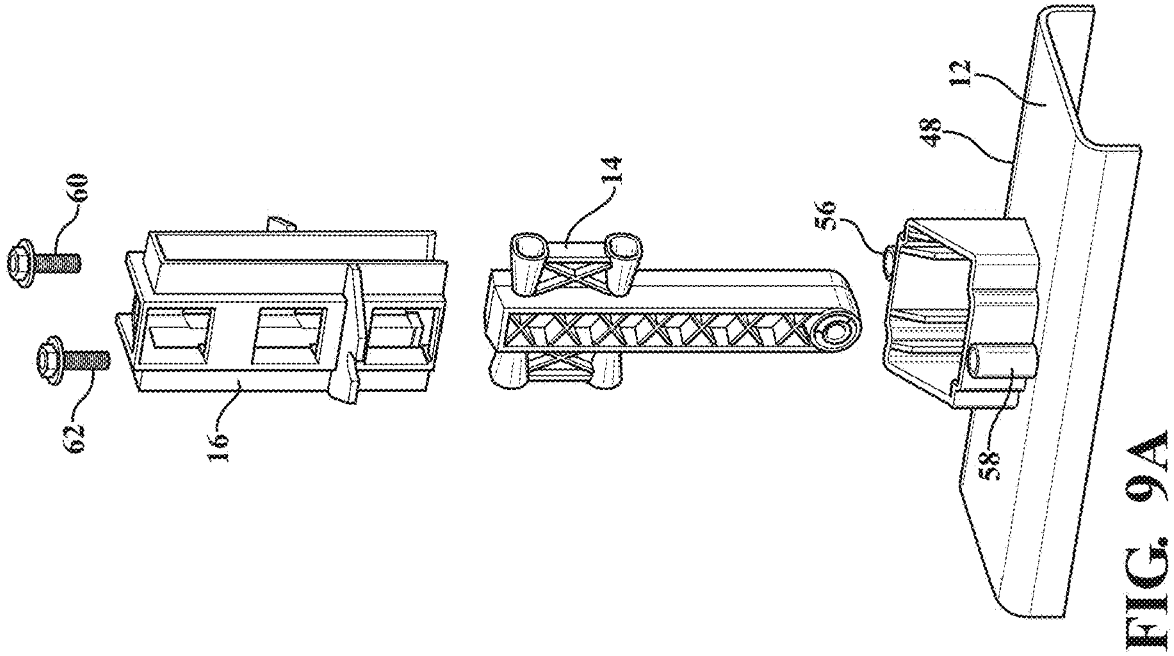
Figure 9C:
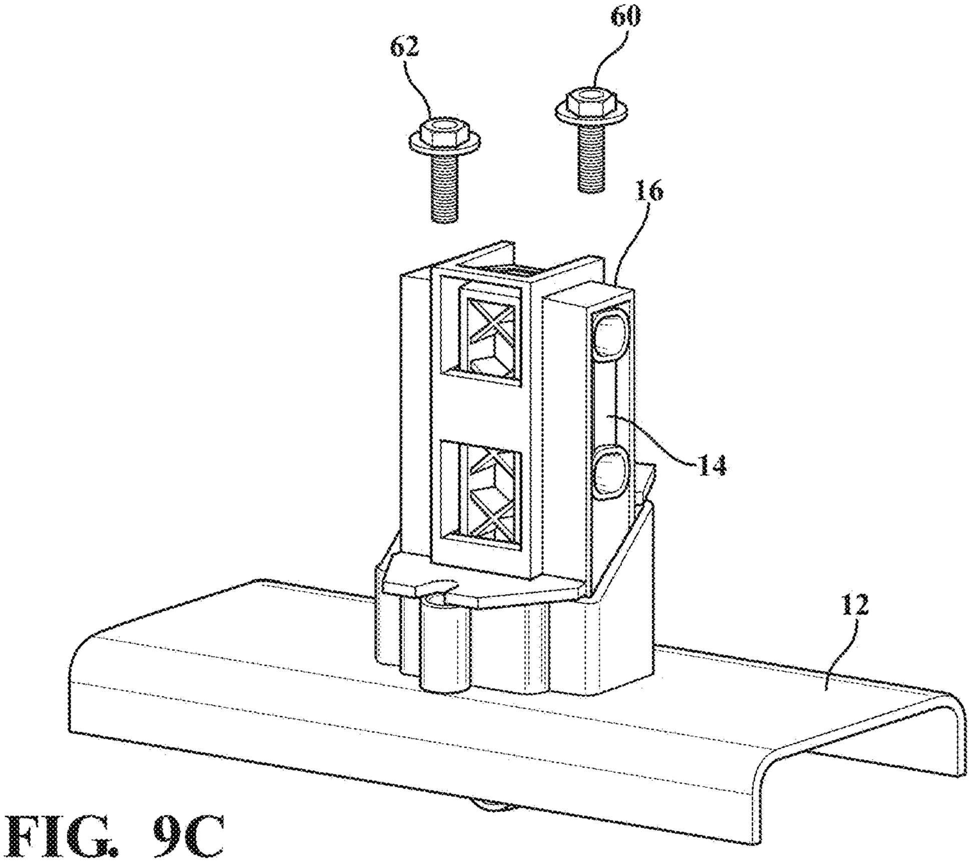
Figure 9D:
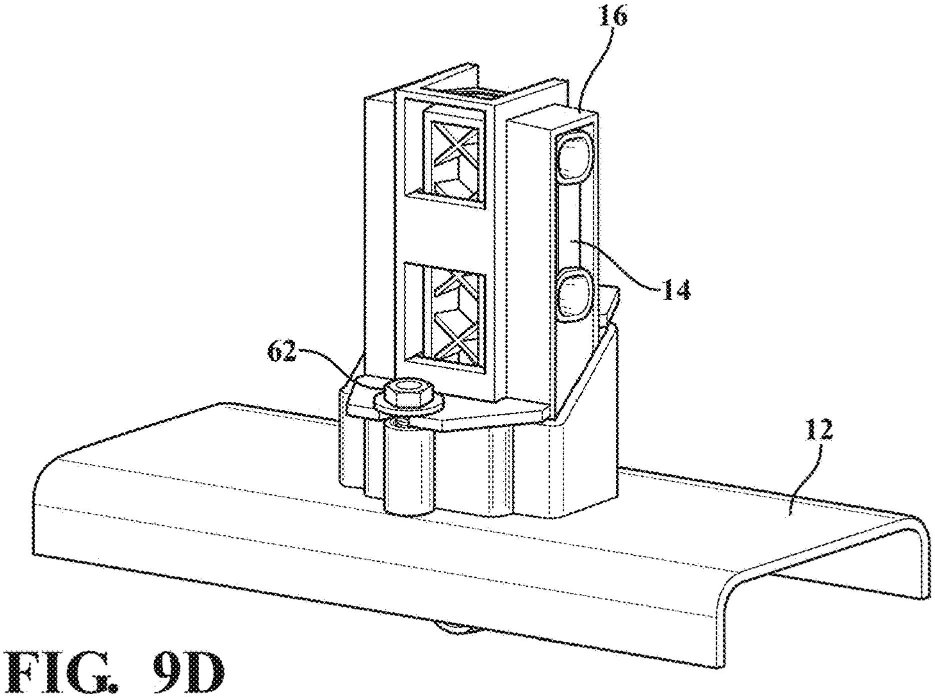
Figure 10A:
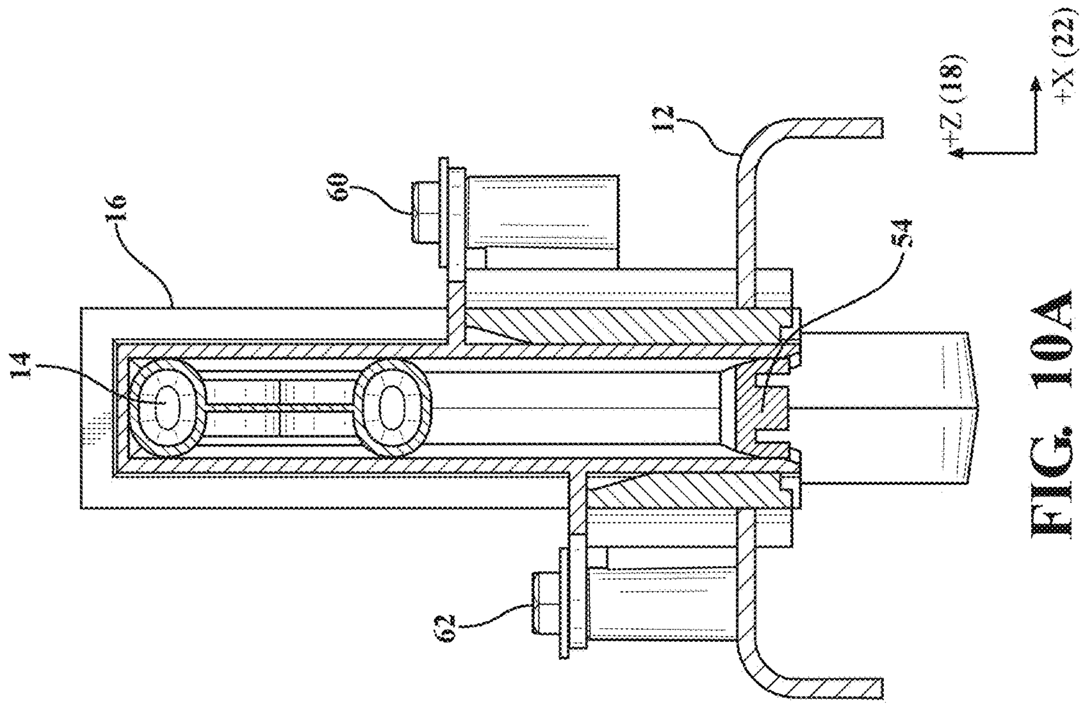
FIG. 10A is a sectional view taken along line 10A-10A of FIG. 10 showing the slide actuator assembly of the present invention mounted to a frame.
Figure 10:
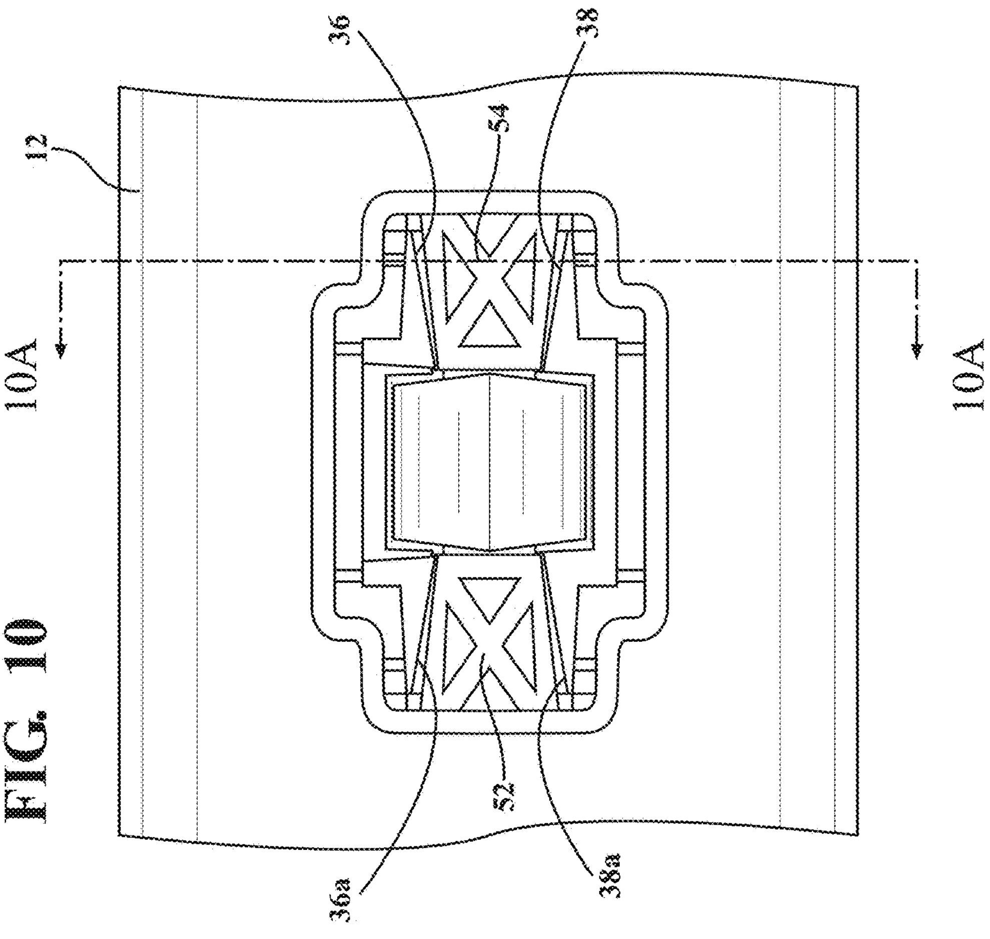
FIG. 10 is a top view of the slide actuator assembly of the present invention mounted to a frame.

The following description of the preferred embodiment(s) is merely exemplary in nature and is in no way intended to limit the invention, its application, or uses.

In accordance with the present invention there is provided an injection molded slide assembly generally shown at 10. The assembly is designed such that all the components can be injection molded. The slide assembly is used with a source providing movement such as a ball screw, linear actuator or motor which provides the sliding motion to the assembly. The slide assembly 10 includes a frame 12, a slide carrier 14 and a slide track member 16. The injection molded slide actuator 10 includes an X (18), Y (20), and Z (22) axis with the slide track member having at least one track slot 26 extending along the y and the Z direction and said slide carrier having at least one cooperating outwardly extending side member 24 for engaging the at least one track slot 26.

As shown in the drawings, in a preferred embodiment the slide carrier includes two pairs of opposed oblong frusto-conical side members 24*a*, 24*b*, 24*c*, and 24*d*. each of the side members has an elongated conical hollow aperture area 25 formed by their side walls 27. These side members 24 are attached with a strengthening rib 28 including side rib strengthening honeycomb structures 30. These side members engaged the slot 26 and opposing slot 26*a* to provide linear movement to the center slide member 32 for actuation or the like. The center slide member 32 has a center solid portion 33 and also includes a strengthening honeycomb structure 34 on the sides not holding the side members 24*a*-24*d*.

The slide track member 16 is designed to include slanted surfaces 36, 36*a* and 38, 38*a* on each side of the truncated "V" cross sectioned track slot 26. These surfaces cooperate with the slanted sides of the side members 24*a*-24*d*. A stop surface 40 is provided at the top of the track slot 26. Side flanges 42 and 44 extend outward and include fastener holes or slots 46.

The frame includes a base portion 48, a slide opening 50, end stops 52 and 54, and fastener bosses 56 and 58 which are provided for receiving fasteners 60 and 62. End stops 52 and 54 provide a stop to movement of the slide carrier 14 in the extended position by interfering with the side members 24*a*-24*d*. As shown in FIGS. 9A-D the slide carrier 14 is nested between the frame 12 and the slide track member 16. After assembly the fasteners 60 and 62 secure the assembly together. Thereafter, it is installed in the final location for actuation of a desired vehicle member.

Referring to FIGS. 4, 4A, 5, 5A, and 5B, in order to manufacture the assembly, the drafts of the parts must be suitable for removal from the injection molding machines. It is important in the present invention that the contact surfaces 36, 36*a*, 38 and 38*a* on the slide track slots 26 are parallel in the Z direction in order to maintain minimal play in the system. Therefore, the main die draw cannot be in the Z direction. Thus, these surfaces are drafted in the X and Y direction such that the slide carrier centers in the area defined by the contact surfaces in the X and Y direction and is slidable in the Z direction. Thus, the surfaces must be consistently parallel in the Z direction to provide proper sliding of the slide carrier 14.

The slide actuator of the present invention is useful in articulating air and ground effect panels such as louvers, spoilers, or the like on vehicles. Any drive mechanism which allows for linear motion of the actuator is used to power the actuator. Linear actuator assemblies, ball screw assemblies, push pull cables or the like can be used to provide movement to the slider.

Figure 11:
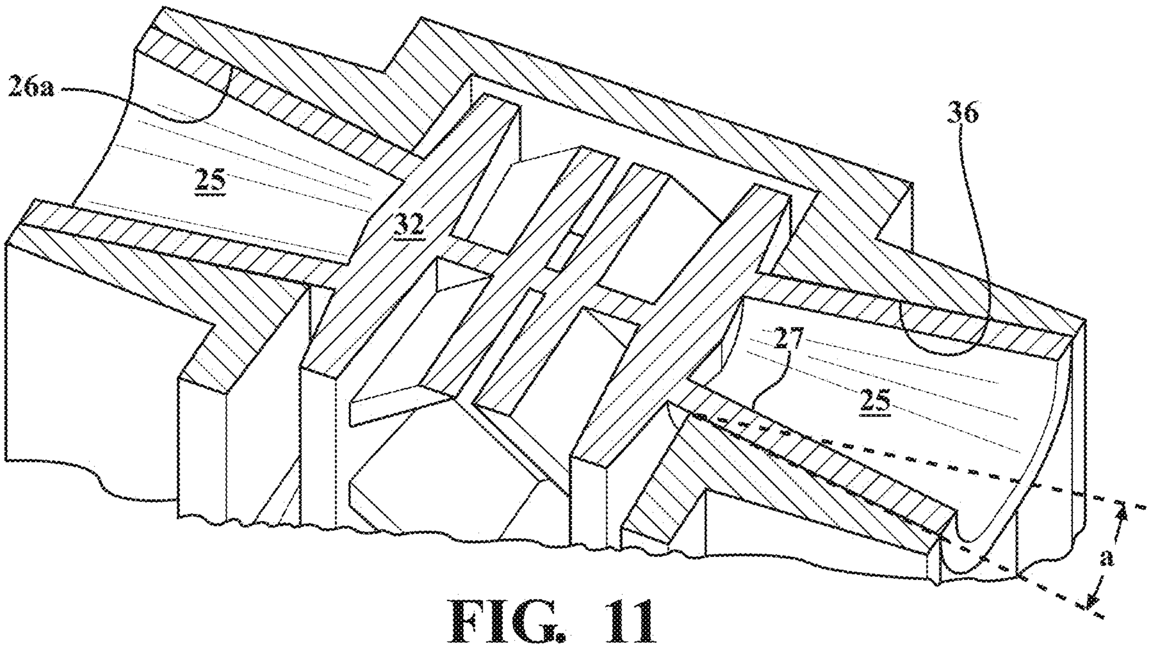
FIG. 11 is a sectional view showing the angle ‘a’ of the draft between the carrier and the side of the slide surfaces.

Referring now to FIG. 11 the angle 'a' is the draft angle of the slot side surfaces 36, 36*a* and 38 and 38*a* and members 24. This angle 'a' is generally from about 1.5 to about 20 degrees, with a typical angle of from about 6 to about 12 degrees and preferred angle of about 8 to about 10 degrees and as shown is about 9 degrees.

Figure 12:
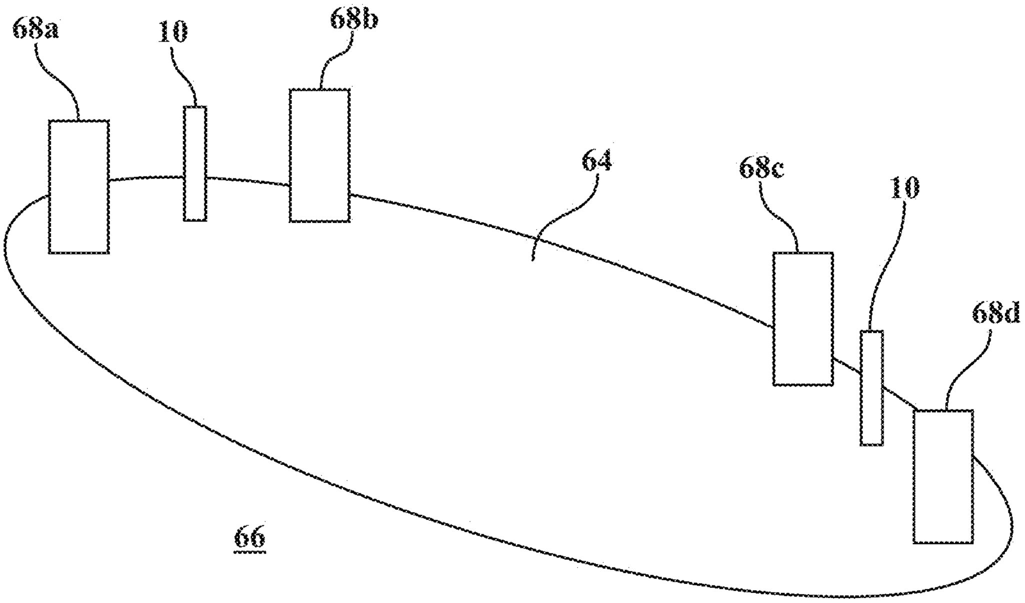
FIG. 12 is a schematic figure showing a use of the linear actuators of the present invention used in raising and lowering of an aerodynamic lower body panel in a vehicle.

Referring now to FIG. 12 there is shown a use of two of the linear actuators 10 of the present invention in raising and lowering of an aerodynamic lower body panel in a vehicle 66. A plurality of sliding guide mechanisms 68*a*-*d* is provided for guiding the panel 64 up and down as desired when the vehicle 66 is being driven. As will be appreciated by those skilled in the art the number of linear actuators and slide mechanisms may be varied depending on the constraints of the application less or more than two linear slide mechanisms 10 would be utilized depending on the application and more or less sliding guide mechanisms 68*a*-*d* could also be utilized.

Figure 13:
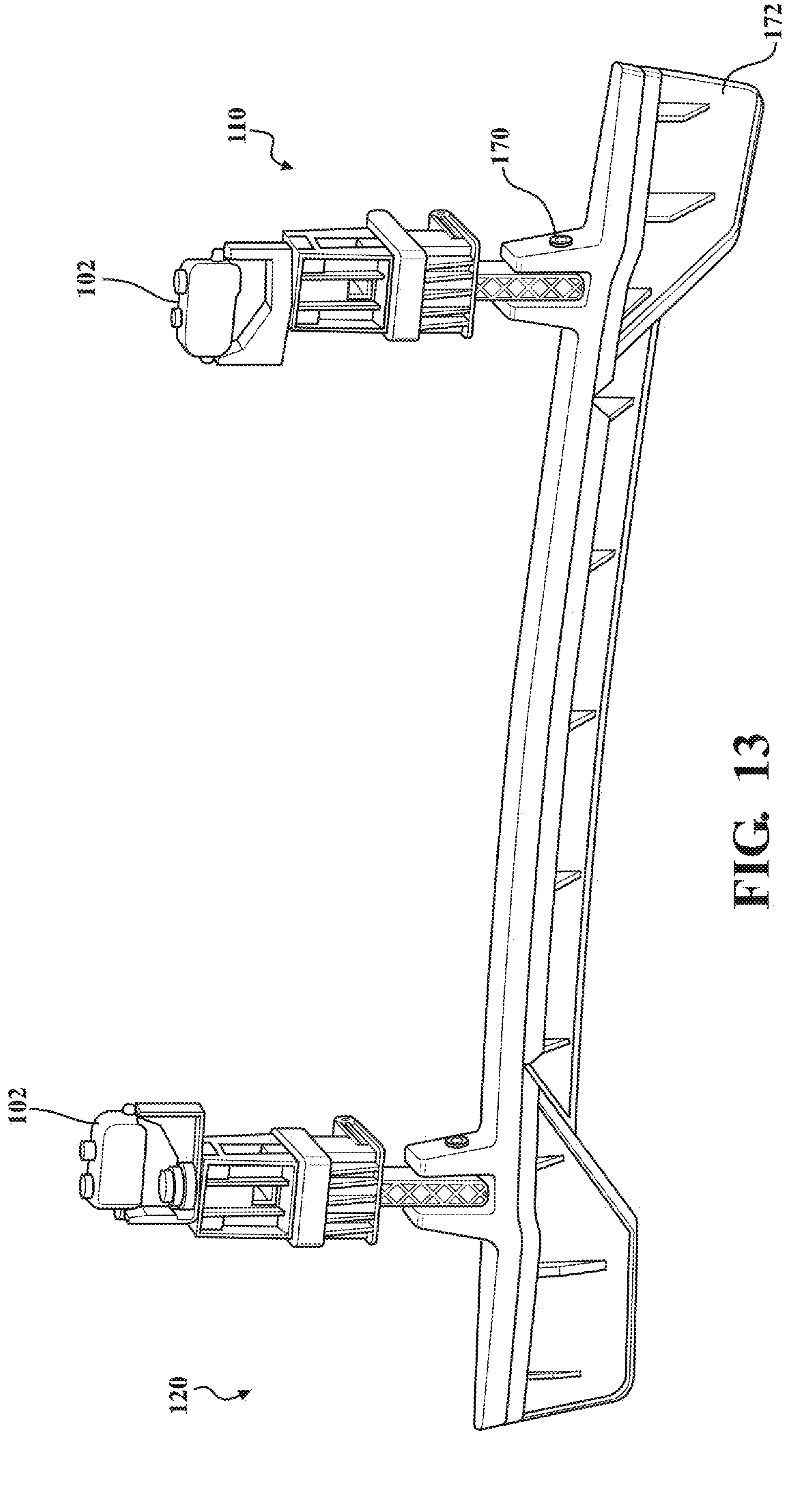
FIG. 13 is a perspective view of an application of the linear actuator used in raising and lowering of an air dam of a vehicle; and, FIG. 14 is a sectional view of the actuator used in FIG. 13 of the present invention.
Figure 14:
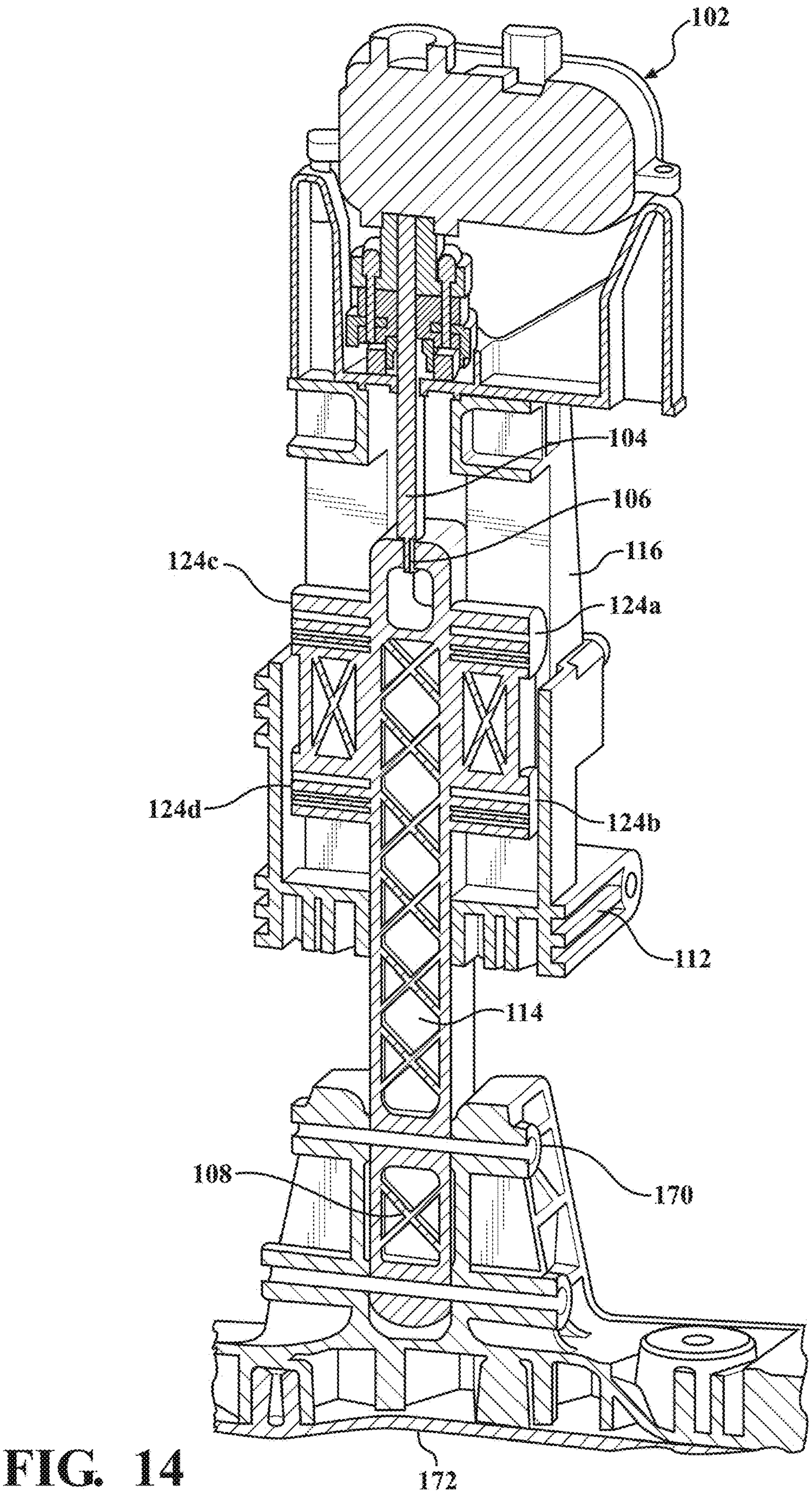

Referring now to FIGS. 13 and 14, there is shown an operational embodiment of the linear actuator of the present invention where corresponding elements are set forth by corresponding numbers differing by 100. Thus, there is provided an injection molded slide assembly generally shown at 110. The assembly is designed such that all the components can be injection molded. The slide assembly is used with a source providing movement such as a ball screw, linear actuator or motor 102 which provides the sliding motion to the assembly. The slide assembly 110 includes a frame 112, a slide carrier 114 and a slide track member 116. A linearly moving shaft 104 of the motor 102 is connected to the slide carrier 114 at a connection end 106 of the slide carrier 114. The other end 108 of slide carrier 114 is connected to the front air dam mount 170 which is connected to the air dam 172 of a vehicle. As is known in the art the air dam or other aero dynamic panel for a side, bottom, spoiler or the like is controlled by a controller attached to the vehicle for deploying the panel and retracting the panel based on operational conditions of the vehicle.

It will be readily appreciated by those skilled in the art that the present invention provides an improvement over other linear slide mechanisms which are more complex, and have more components and which require heavier and more tooling. It is also more simple of a procedure to assemble the present actuator. The present actuator is more durable than previous actuators. In the present invention there are reduced numbers of components than previous actuators, requiring only three (3) injection molded components plus two (2) fasteners in one embodiment. The actuator of the present invention requires no expensive bushings and provides a simplified assembly of the linear slide mechanism compared to alternative designs, lowering assembly costs. Generally, the actuator of the present invention has lower material/tooling costs because of decreased number of components than previous designs and is scalable for use in various final assemblies. Thus, depending on the application, the present invention can be made more or less robust, with shorter or longer travels, while having less weight for the application than previous designs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An injection molded slide actuator assembly, comprising:

a frame, a slide carrier and a slide track member, each having X, Y, and Z axes, with the slide track member having at least one track slot defined by slanted surfaces spaced apart in the direction of the X-axis, the slanted surfaces being linear and inclined in the direction of the Y-axis providing a variable dimension of the at least one track slot in the direction of the X-axis, and said slide carrier having at least one outwardly extending side member received within the at least one track slot and slidable along the Z-axis relative to the slide track member, the at least one outwardly extending side member has slanted side walls engageable with the slanted surfaces so that movement of the slide carrier relative to the slide track member is constrained in the directions of the X-axis and the Y-axis.

2. The injection molded slide actuator of claim 1 wherein the at least one outwardly extending side member has a frustoconical shape going from narrow to wide in the direction of the Y-axis.

3. The injection molded slide actuator of claim 1 wherein the slanted surfaces define a truncated V-shaped cross-section of the at least one track slot.

4. The injection molded slide actuator of claim 1 wherein there is at least a pair of said track slots and at least a pair of said outwardly extending side members with at least one outwardly extending side member in each track slot.

5. The injection molded slide actuator of claim 1 wherein the frame has at least one stop engageable by the outwardly extending side member to limit movement of the slide carrier in at least one direction along the Z-axis.

6. The injection molded slide actuator of claim 1 wherein the at least one outwardly extending side member is narrower at an end connected to a center portion of the slide carrier than at an opposite end of the at least one outwardly extending side member.

7. The injection molded slide actuator of claim 1 wherein the slanted surfaces are slanted at an angle of from about 1.5 to about 20 degrees relative to the Y-axis.

8. An injection molded slide actuator assembly, comprising:

a frame, a slide carrier and a slide track member with the slide track member having at least one track slot having a truncated V-shape in cross-section and said slide carrier having at least one outwardly extending side member having slanted side walls complementary in shape to the at least one track slot and engaging the at least one track slot during movement of the slide carrier relative to the slide track member in a first direction to constrain movement of the slide carrier relative to the slide track member in directions other than the first direction.

9. The injection molded slide actuator of claim 8 wherein the side walls of the at least one outwardly extending side member are arranged for engaging a side slanted surface of the at least one track slot.

10. The injection molded slide actuator of claim 9 wherein the at least one outwardly extending side member has a frustoconical shape going from narrow at an end connected to a center portion of the slide carrier to wide at an opposite end not connected to the center portion.

11. The injection molded slide actuator of claim 10 wherein the center portion is slidably received within an open area of the slide track member and into a slide opening of the frame.

12. The injection molded slide actuator of claim 9 wherein there is a pair of said track slots and at least a pair of said outwardly extending side members in each of the track slots.

13. The injection molded slide actuator of claim 12 wherein the frame has at least one stop engageable by at least one outwardly extending side member to limit movement of the slide carrier in the first direction.

14. The injection molded slide actuator of claim 8 wherein the frame and the slide track member are secured together with fasteners thereby entrapping the slide member.

15. The injection molded slide actuator of claim 8 wherein the slanted side walls are at an angle of between 6 to 12 degrees relative to a direction perpendicular to the first direction.

16. An injection molded slide actuator assembly, comprising:

a frame, a slide carrier and a slide track member wherein each component has an X, Y, and Z axis with the slide track member having two oppositely arranged tracks extending along a track direction in the Z direction, each track including angled surfaces which are spaced in the X direction from one another and are "V" shaped in cross section with a narrower portion of the track arranged closer to a center of the slide track member and said slide carrier having at least one cooperating outwardly extending side member in each track with each outwardly extending side member being complementary in cross-sectional shape to the tracks for guided slidable movement along the tracks in the Z direction with relative movement in the X and Y directions between the slide carrier and the slide track member being limited by engagement of the outwardly extending side members with the angled surfaces of the tracks.

17. The injection molded slide actuator of claim 16 wherein the frame has at least one stop for providing a stop against the outwardly extending side member moving past an endpoint.

18. The injection molded slide actuator of claim 16 wherein the frame and the slide track member are secured together with fasteners thereby entrapping the slide member.

19. The injection molded slide actuator of claim 16 wherein the angled surfaces are at an angle of from about 8 to about 10 degrees relative to the Y direction.

* * * * *